Figure 6:
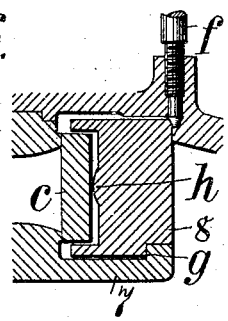

No. 845,583. PATENTED FEB. 26, 1907.
R. SCHULZ.
MEANS FOR REGULATING TURBINES.
APPLICATION FILED MAR. 1, 1906.
2 SHEETS—SHEET 1.
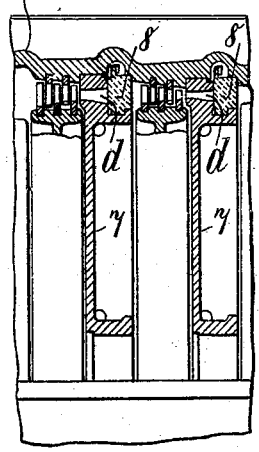
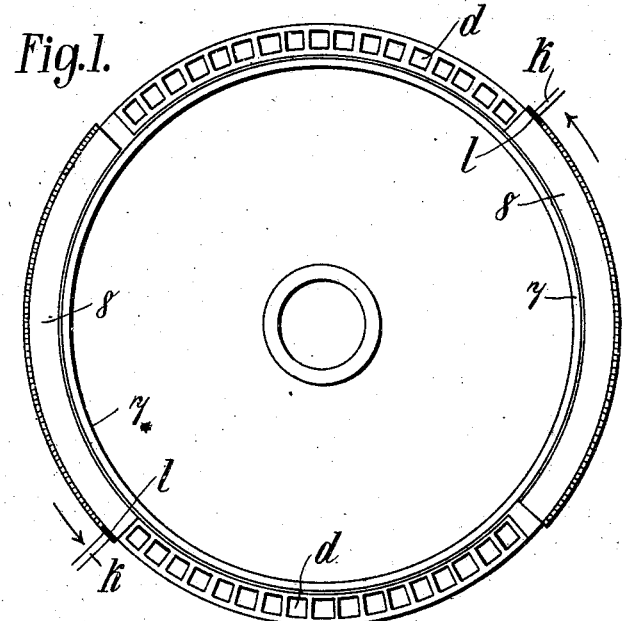
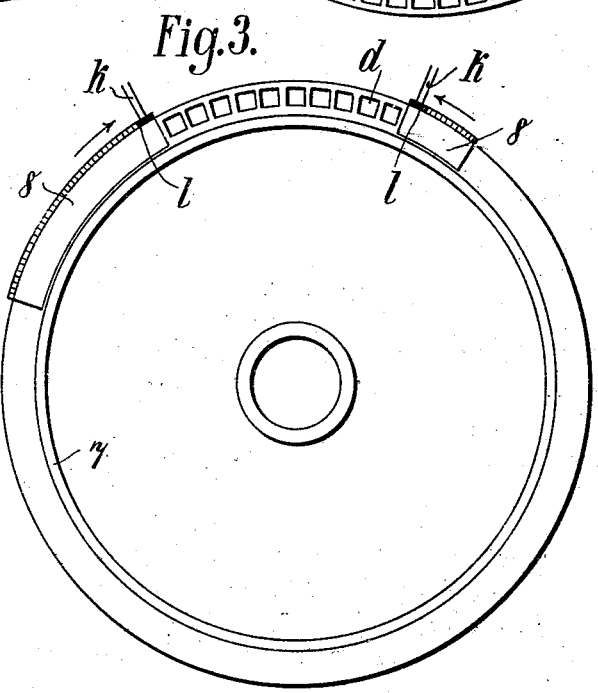
Witnesses.
H. L. Amer.
R. Sommers.
Inventor.
Richard Schulz.
by Henry Orth Jr., atty.

No. 845,583. PATENTED FEB. 26, 1907.
R. SCHULZ.
MEANS FOR REGULATING TURBINES.
APPLICATION FILED MAR. 1, 1906.

2 SHEETS—SHEET 2.

Witnesses.
H. L. Amer.
O. P. Sommers

Inventor.
Richard Schulz,
by [signature] atty.

UNITED STATES PATENT OFFICE.

RICHARD SCHULZ, OF BERLIN, GERMANY.

MEANS FOR REGULATING TURBINES.

No. 845,583.     Specification of Letters Patent.     Patented Feb. 26, 1907.

Application filed March 1, 1906. Serial No. 303,685.

*To all whom it may concern:*

Be it known that I, RICHARD SCHULZ, a subject of the King of Prussia, residing at Berlin, Flensburgerstrasse 2, Germany, have invented certain new and useful Improvements in Means for Regulating Steam-Turbines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to steam-turbines, and more particularly to the construction and arrangement of the means for regulating the sections of the steam passages or nozzles of the guide apparatus in impulse steam-turbines to correspond to the power desired.

Impulse steam-turbines only work efficiently so long as they develop their maximum power, as the sectional shape and size of the steam passages or nozzles are calculated for this. If for less power a less quantity of steam is admitted, by throttling the steam on its entrance into the first ring of the blades it has its pressure already too much reduced, and therefore is inefficiently utilized. In a known arrangement in order to avoid this drawback a regulation of the sections of the guide-passages in the guide-rings to correspond to the power desired is obtained by means of an annular slide, which is arranged in front of each guide-ring or portion of the same in such a way that by turning the annular slide relative to the guide-ring or else by turning the guide-ring relative to the annular slide a greater or less number of steam passages or ports in the guide-ring may be kept closed. In order to obtain the most efficient utilization of the steam, governing by means of such a slide in the form of a closed ring is not sensitive enough, as several guide-passages must always be simultaneously closed and again opened in several parts of the guide-ring, and all the closing edges of the slide must share in the cutting off. This drawback is avoided in the present invention. For this purpose one or more circular slides—that is to say, slides in the form of annular sections—are arranged in front of the group of guide passages or nozzles of the respective guide-rings in order to close a single guide passage or nozzle in the guide-ring and to allow of the steam being conducted in as wide jets as possible from one group of nozzles into the next lower step or stage.

In order to obtain an absolutely certain closure of the guide passages or nozzles, the annular or circular slides are provided with separate packing means in the form of a closed ring or separate annular pieces or washer-plates for each guide passage or nozzle to be closed.

Referring to the accompanying drawings, in which like parts are similarly designated, Figure 1 is a front view of one form of construction for two groups of inlet apertures or nozzles in a guide-ring, each group provided with a slide. Fig. 2 is a longitudial section of the part of the turbine in question. Fig. 3 shows only one group of inlet apertures or nozzles in the guide-ring provided with two slides; and Figs. 4-10 are cross-sections, on an enlarged scale, of various examples of construction of the packing for the regulating-slide.

In all the examples the guide-ring is indicated by 7 and the regulating-slide by 8. In order to turn the latter, a circular rack is arranged thereon in the ordinary way, with which rack a pinion $l$ on a shaft $k$ gears, this shaft being carried through the wall of the turbine-casing $e$ and a tight joint formed by means of a stuffing-box. The adjustment of the slide may also be effected by means of other known devices—for instance, by means of a worm-toothed ring or by means of levers.

In the example shown in Fig. 1 two groups of inlet apertures or nozzles $d$ are provided in the guide-ring 7, and for each group a circular or arcuate slide 8, in the form of a part of a ring, is arranged in front of the guide-ring. The respective groups of nozzles $d$ may now be each regulated independently by a slide 8, so that up to the entire closing of one group of nozzles the nozzles of the other group (or, if desired, of other groups) may remain open to their full extent and the steam emerging therefrom may come into action in a broad jet to its fullest extent. In addition to its use for multistage pressure-turbines the arrangement is of course also applicable for single stage ones, in order to limit, as far as possible, the extent of the throttling of the steam and to utilize the steam as completely as possible. In contrast to a full annular slide regulating simultaneously three groups of nozzles I use, for instance, three slides in the form of independently-adjustable annular or arcuate pieces, whereby only one nozzle may be shut off from action instead of three. A complete circular slide is unsuitable for the finer regulation when it is only intended to shut off one nozzle. Even for small pressure the utility of this governing mechanism is easily explained. One curved slide 8 is adjusted or displaced first from, for instance, the second or third inlet aperture or nozzle of a stage of pressure, and, if necessary, one group of nozzles is entirely shut off. Then the adjustment of the second group of nozzles is proceeded with. By this method of governing the steam-jet only becomes smaller in one of the passages or apertures, while the jet passing through the other apertures remains as broad as possible. Instead, therefore, of regulating several steam-jets the regulation is limited to only one, and a more efficient utilization of the steam is thereby obtained.

In the special example shown in Fig. 3, intended for multistage impulse-turbines, two circular or arcuate slides 8 are provided for regulating only one group of inlet apertures or nozzles $d$. The group of nozzles here extends, as is usually the case in such impulse-turbines, over only a short portion of the periphery of the guide-ring 7. This form of construction is more particularly adapted for the first stages of pressure that work with large drops of both pressure and temperature, said stages having the smallest area for the passage of steam. The steam passes out from the last lower stage in a considerably broader jet than when it enters the first lower stage and is diverted to one side in its course through the turbine-wheels. Therefore in such impulse-turbines it is advantageous to regulate from both ends of a group of passages by means of two slides, the guide-passages being arranged in proximity to one another on a short part of the periphery of the guide-wheel. The steam from a previous stage of pressure may thus in the shortest way and with small resistance reach the inlet-apertures and guide-passages which have been left open. In such cases the two circular slides 8 are not of equal length, but rather one is short and the other so long that the guide-passages are closable entirely or almost entirely, as required. In order now to obtain an absolutely certain closing, the slides are preferably provided with washer or packing arrangements.

Figure 4:
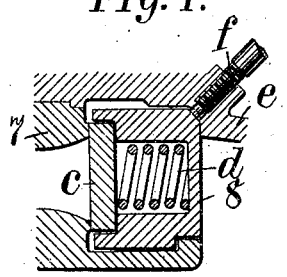

In the example shown in Fig. 4 a straight or curved groove is turned in the front end (the wall adjacent to the guide-ring 7 of the annular slide 8,) which groove serves for receiving a packing-ring or a segment of a packing-ring $c$. The latter is preferably of slight thickness and is pressed by the working steam on its seat on the guide-ring 7. In order to better press the packing member on the seat, special springs, such as $d$, are preferably arranged under certain circumstances in the slide 8, which springs act on the back of the packing member or washer $c$. The springs may also be formed otherwise. In order to obtain an absolutely certain shutting off of the steam by means of the slide 8 and packing $c$, the back of the slide 8 may, for instance, be pressed to its seat and adjusted by means of a pressure-screw $f$, carried through the turbine-casing $e$. This pressing on of the back of the slide may also be effected by other means—for instance, by a wedge device or the like.

Figure 5:
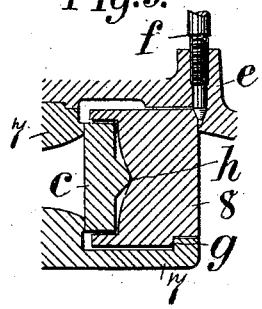
Figure 7:
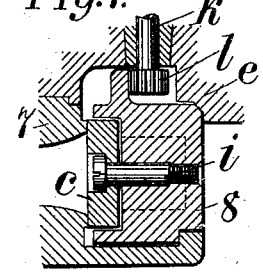

In the example shown in Fig. 5 there is a special supporting edge $g$ on the inner wall of the slide 8, which edge bears against an outwardly-projecting edge of the guide-ring 7, and in the middle of the back of the part $c$ of the packing there is a rib or projection $h$ of suitable profile for transmitting pressure along the middle line, which rib bears against the front wall of the slide 8. In the example shown in Fig. 6 such projection $h$ is not provided on the part $c$ of the packing, but on the inner wall of the slide 8. A pressure-screw $f$, carried through the case $e$ of the turbine, presses with its conical point against the slide 8, which finds a counter support in the supporting edge $g$, the pressure being transmitted by the slide 8 exactly in its center line at $h$ on the center line of the part $c$ of the packing. The part $c$ of the packing may thus be caused to form a tight joint, even if the slide should be somewhat displaced. In such a case the spring $d$ is dispensed with. A further advantage in the employment of separate packing members $c$ in the slides 8 consists in the division being capable of being carried so far that each guide-passage has a separate packing $c$. For each packing or washer plate a short rib $h$ is provided on its back opposite the slide 8 with a separate spring—such, for instance, as $d$, Figs. 4 and 10. In the example shown in Fig. 7 such a washer-plate $c$ is assumed to be employed. As shown in Fig. 7, the displacement of the annular slide 8 is effected by means of a spindle $k$, carried through the turbine-casing $e$ and there tight-jointed by means of a stuffing-box. The pinion $l$ on this spindle gears with the curved rack on the slide. The tangential displacement of the packing-plates $c$ in the annular groove formed in the front wall of the slide 8 is prevented by retaining-screws $i$, screwed into the slide 8 between a pair of the contact edges of the packing-plates. The heads of these screws are countersunk in a recess in the face of the packing-plates $c$, Fig. 7. Each packing-plate may freely move within narrow limits between two retaining-screws, which prevent it falling out of the slide.

Figure 8:
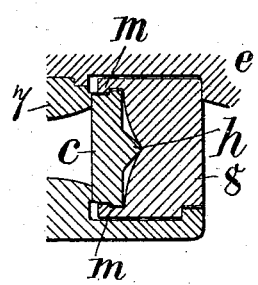
Figure 9:
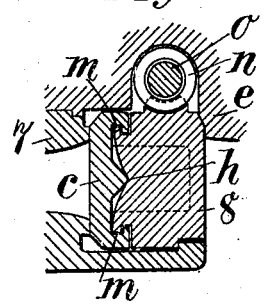

In the examples shown in Figs. 8 and 9 the falling out of the packing-plates $c$ from the slide 8 is prevented by the edges or flanges $m$ of the plates and the slide overlapping one another. In Fig. 8 the edges m project into annular grooves on the slide 8.

In Fig. 9, on the other hand, edges on the slide 8 embrace edges on the packing-plate c. Here also the part c of the packing is allowed a limited circular movement relative to the slide 8. By arranging the seat on the nozzles somewhat raised as compared to the other part of the guide-ring 7 it follows that pressure is not transmitted to the guide-ring by that portion of the packing not contacting with the guide-channel. In order to adjust the slide 8 and the packing-pieces c, a worm n on a shaft o, carried through the turbine-casing, engages with a curved rack on the slide.

Figure 10:
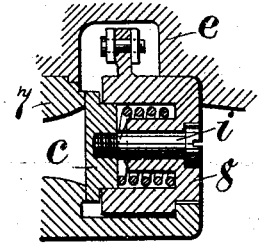

Fig. 10 shows another form of construction of the part c of the packing for use where each guide-passage has a separate packing-plate. The slide 8 (annular or curved slide) is here perforated for receiving a headed screw i, which connects plate c with slide 8. The headed screw i is inserted from the back of the slide, and its head is countersunk therein. The front wall of the slide 8 is recessed to a suitable depth. In this recess there is a spring d, pressing the packing-plate against the seat, which springs bear on a cylindrical projection mounted on the back of the packing-plate and fits loosely in the recess of the slide 8. The plate c is here also allowed sufficient movement within narrow limits. The closing surface in the guide-passage is made raised, so that when a packing-plate is moved away from it no pressure is transmitted by it to the guide-ring 7.

I claim—

1. In an axial steam-turbine the combination with a group of steam-passages therein of two arcuate slides arranged in front of said passages and means to move the slides to successively close the passages from both ends of the group, substantially as described.

2. In an axial steam-turbine the combination with a group of steam-passages therein of two arcuate slides vertically arranged in front of said passages, said slides of different length and means to move the slides to successively close the passages from both ends of the group, whereby the longer slide will have the greater travel and control the larger number of ports, substantially as described.

3. In a steam-turbine the combination with a group of steam-passages of an arcuate slide to successively close the passages and an arcuate packing carried by the slide and between it and the entrance to the passages, substantially as described.

4. In a steam-turbine the combination with an arcuate directing member having steam-passages formed therein, of a controlling member comprising two elements, one an arcuate slide, and the other a packing, one of said elements having a rib bearing against the adjacent face of the other element, substantially as described.

5. In a steam-turbine, the combination with a directing member having steam-passages formed therein, of a controlling member comprising two elements, one an arcuate slide having two flanges directed toward the steam-passages and the other a packing held between said flanges, one of said elements having a medial rib bearing against the adjacent face of the other element, substantially as described.

6. In a steam-turbine the combination with a directing member having steam-passages therein of a controlling member coöperating therewith comprising two elements, one an arcuate slide having flanges and the other a packing held between the flanges and means to prevent the lateral displacement of the elements, one of said elements having a rib that engages the adjacent face of the other element, substantially as described.

7. In a steam-turbine the combination with an arcuate directing member having steam-passages therein and an internal flange said flange having a shoulder, of a controlling member also having a shoulder and seated between the ends of the steam-passages and shoulder on said flange, said controlling member comprising two elements one a slide having flanges projecting toward the steam-passages and the other a packing held between the flanges and springs between the two members, substantially as described.

8. In a steam-turbine the combination with a directing-ring having steam-passages therein and a flange projecting beyond the entrances of said passages, said flange having a shoulder at the outer edge; of a controlling member comprising two elements, one an arcuate slide having a shoulder seated on said flange between the shoulder thereon and the steam-passages and having flanges directed toward the steam-passages, and the other a packing held between the flanges on the slide, substantially as described.

In testimony that I claim the foregoing as my invention I have signed my name in presence of two subscribing witnesses.

RICHARD SCHULZ.

Witnesses:
JOHANNES HEIN,
HENRY HASPER.